United States Patent
Leitner-Wise et al.

(10) Patent No.: US 6,744,154 B2
(45) Date of Patent: Jun. 1, 2004

(54) METHOD AND APPARATUS FOR GENERATING ELECTRICAL ENERGY

(75) Inventors: Paul Leitner-Wise, Alexandria, VA (US); Richard Peter West, Hatfield (GB)

(73) Assignee: Leitner-Wise Rifle Co., Inc., Alexandria, VA (US)

( * ) Notice: Subject to any disclaimer, the term of this patent is extended or adjusted under 35 U.S.C. 154(b) by 0 days.

(21) Appl. No.: 09/923,319

(22) Filed: Aug. 8, 2001

(65) Prior Publication Data

US 2003/0030280 A1 Feb. 13, 2003

(51) Int. Cl.[7] .............................................. H02K 41/00
(52) U.S. Cl. ......................................... 310/12; 290/1 R
(58) Field of Search ............................... 310/12, 13, 14, 310/164; 290/1 R; 318/135

(56) References Cited

U.S. PATENT DOCUMENTS

| | | | | |
|---|---|---|---|---|
| 3,257,905 A | * | 6/1966 | Weisman et al. | 89/1.1 |
| 3,636,390 A | * | 1/1972 | Stauder et al. | 310/14 |
| 3,973,500 A | * | 8/1976 | Brede et al. | 310/46 X |
| 4,321,020 A | * | 3/1982 | Mittal | 417/320 |
| 4,787,289 A | * | 11/1988 | Duer | 89/36.02 |
| 4,862,021 A | * | 8/1989 | LaRocca | 310/10 |
| 5,650,681 A | * | 7/1997 | DeLerno | 310/164 |
| 5,818,132 A | * | 10/1998 | Konotchick | 310/17 |

* cited by examiner

Primary Examiner—Burton S. Mullins
Assistant Examiner—Judson H. Jones
(74) Attorney, Agent, or Firm—Reed Smith, LLP

(57) ABSTRACT

The present invention provides a method and apparatus for generating electrical energy. In particular, the invention provides devices and methods by which the explosive energy provided by highly combustible propulsive sources, such as solid, liquid and gaseous propellants, can be used to generate sufficient electrical energy to power devices such as high energy spark generators, portable cardiac defibrillators, lasers and the like. The apparatus used can be compact, highly portable, and reusable. By providing a storage device and electrical discharge control, the method and apparatus can be adapted to power low energy devices over an extended period of time.

11 Claims, 4 Drawing Sheets

METHOD AND APPARATUS FOR GENERATING ELECTRICAL ENERGY

FIELD OF THE INVENTION

The present invention is directed to a method and apparatus for generating electrical energy. In particular, the invention provides a means by which the explosive energy provided by highly combustible propulsive sources, such as solid, liquid and gaseous propellants, can be used to generate sufficient electrical energy to power devices such as high energy spark generators, portable cardiac defibrilators, lasers and the like. The apparatus used can be compact, highly portable, and reusable. By providing a storage means and electrical discharge control, the method and apparatus can be adapted to power low energy devices over an extended period of time.

BACKGROUND OF THE INVENTION

High energy systems require considerable electrical power in order to operate. Typically, energy levels in the hundreds of joules and greater are needed for devices such as defibrilators, lasers and the like. Such energy levels are commonly obtained by precharging one or more capacitors which are then quickly discharged into the device to be operated.

In view of the energy levels required, the capacitors are generally charged over a period of time from a constant power source, such as line current, which limits their portability and repeated use since the source must be present to provide a charge and/or recharge. Alternatively, storage batteries which are themselves heavy, have a finite life and must be periodically recharged by a separate power source are used.

Propellants, or explosive systems, exist in a wide range of physical forms from single compounds such as TNT to mixtures of substances and may be in solid, liquid or gaseous form. These compounds undergo rapid chemical reactions when ignited forming high pressure gases and releasing energy in the form of heat. Explosive materials are generally classified as either "low" or "high" depending on the rate of combustion. Low explosives burn at a rate of oxidation that is well below the speed of sound and produce gases at a manageable rate. These materials are used mainly as propellants for gun cartridges, solid fuel rockets and the like. High explosives burn at hypersonic speeds, i.e., 2,000 m to 8,500 m per second, so that the released gases form shock waves which shear and shatter nearby objects.

The purpose of propellants is to generate gases under pressure which can be used to provide thrust for a projectile. In most instances the gases are the means by which the energy released by combustion is converted to the work of pushing a projectile through the air. Other than for this purpose, the energy released does nothing else and is dissipated. The present invention seeks to provide a method whereby this energy can be used to generate electricity in a relatively simple manner and in an apparatus which can be readily carried by one individual. The invention further provides a means whereby electricity can be generated in high energy pulses for immediate use by high energy devices or stored and distributed in a controlled manner to low energy devices.

Electrical generators operate by rotation of a magnet within a coil to induce a current. This has been the principle on which electrical generators have worked since the electrical age began. The motive force to rotate the magnet in a generator has generally been provided by an external force such as steam, water, wind or the like in apparatus which has necessitated a large, fixed facility. Portable generators are usually powered either by a hand crank and have a limited output, or by a gasoline or diesel motor which is used to drive the shaft on which the magnet is mounted. Such generators are bulky, heavy, awkward and not easily portable. In addition, they require an fuel source that is also not easily transported. The output of the generator is in part governed by the speed of rotation of the magnet within the coil and in part by the windings in the coil and the field of the magnet. Where the windings and the magnetic field of two generators are identical, faster rotation of the magnet within the coil in one generator will produce a higher output than a slower rotation of the magnet within the coil of the other generator in accordance with the law of Energy= Velocity$^2$.

By combining the motive force provided by explosive propellants with the principles of a generator, the inventors herein have devised a method and apparatus whereby these two features have been combined to provide a portable means to generate the energy levels needed to operate high energy systems in the field away from other sources of power. In addition, by providing a storage means, such as a bank of capacitors, and a controlling means, the high output of the method and apparatus of the present invention can be used to operate constant low level load systems over an extended period of time with periodic refreshing of the storage means.

SUMMARY OF THE INVENTION

It is an object of the present invention to provide a method and apparatus for generating electricity.

It is a further object of the present invention to provide a method and apparatus for generating electricity using the motive power generated by an explosive propellant.

It is a still further object of the present invention to provide a method and apparatus for the generation of electricity which is portable and which is capable of generating a high energy pulse suitable for use by high energy loads and which has a means for storing electricity for controlled release to low energy loads.

Further objects and advantages will become evident from the following description and claims.

In a basic configuration, the apparatus comprises a generator which operates by propelling a magnetic element through a series of electrical coils. The rapidly changing magnetic flux within the coils induces an electrical current in line with the existing laws for such machines. In this way, a single high energy electrical pulse can be created from a relatively simple apparatus. By utilizing appropriate power storage, control and discharge means, the generation of successive single pulses can be readily adapted to a variety of usable outputs including low energy continuous load devices as well as high energy pulse load devices.

In its simplest embodiment, the generator is constructed from copper coils wound around a bored barrel of non-magnetic, non-conductive material which is used to guide the magnetic element. Other conductor material may be used for the coils, including superconductors. The barrel is straight and of any suitable length to contain sufficient coils for the generation of the required amount of power to suit the final application or load. A simple receiver, sear and firing pin mechanism is attached to one end and is adapted to receive a cartridge comprising a casing housing a primer and propellant charge with the casing crimped to a magnetic element of a caliber corresponding to the barrel. A trigger mechanism activates the firing pin to fire the cartridge in the normal manner, thereby propelling the magnetic element along the barrel. In an alternative embodiment, the barrel may be circular so as to provide a continuous raceway for a trapped magnetic element thereby providing an effective infinite length to enable the extraction of the maximum amount of power from the passage of the magnetic element. In this instance, a "blank" cartridge may be used to provide the propellant gasses with appropriate means for admission of the pulse of gas into the barrel to propel the magnetic element.

The generator is unique in that it employs the pulse of energy created by the combustion of a ballistic propellant to drive a magnet through the coils thereby generating electrical energy which is extracted and used to power an electrical load. With a straight barrel, the length is such as to suite the particular application and may even be of sufficient length to slow the magnetic element sufficiently to permit its capture and reuse. Energy generated in an application utilizing typical existing firearm cartridge propellants may be in the region of 500 joules. Larger cartridges are capable of producing greater energy levels. When stored, the generated energy is available for discharge in comparatively short periods of time, about 1 millisecond, providing extremely high peak energy levels such as that required by laser flash lamps and cardiac defibrilators.

Thus, the present invention provides an apparatus for generating electrical energy comprising, an elongated conduit having a central bore adapted to receive a magnetic element for passage therethrough, a plurality of wire coils wound about the conduit and spaced along the length thereof, a magnetic element sized to pass through the bore, and means to propel the magnetic element through the bore, whereby passage of the magnetic element through the bore induces an electrical current in the coils.

The present invention also provides a method of generating electricity comprising propelling a magnetic pellet through at least one stationary tubular field coil.

The present invention further provides a method of generating electricity from high pressure combustion gases comprising, providing a plurality of field coils in substantially linear arrangement on a barrel having a central bore therethrough, providing a magnetic armature sized to pass through the bore, providing a means to propel the armature through the bore comprising a ballistic propellant capable of generating high pressure combustion gases directed against the armature in a direction corresponding to the linear arrangement of the field coils, and propelling the magnetic armature through the bore whereby the magnetic field of the armature passing across the field coils induces electrical current in the coils.

DETAILED DESCRIPTION OF THE INVENTION

Figure 1:
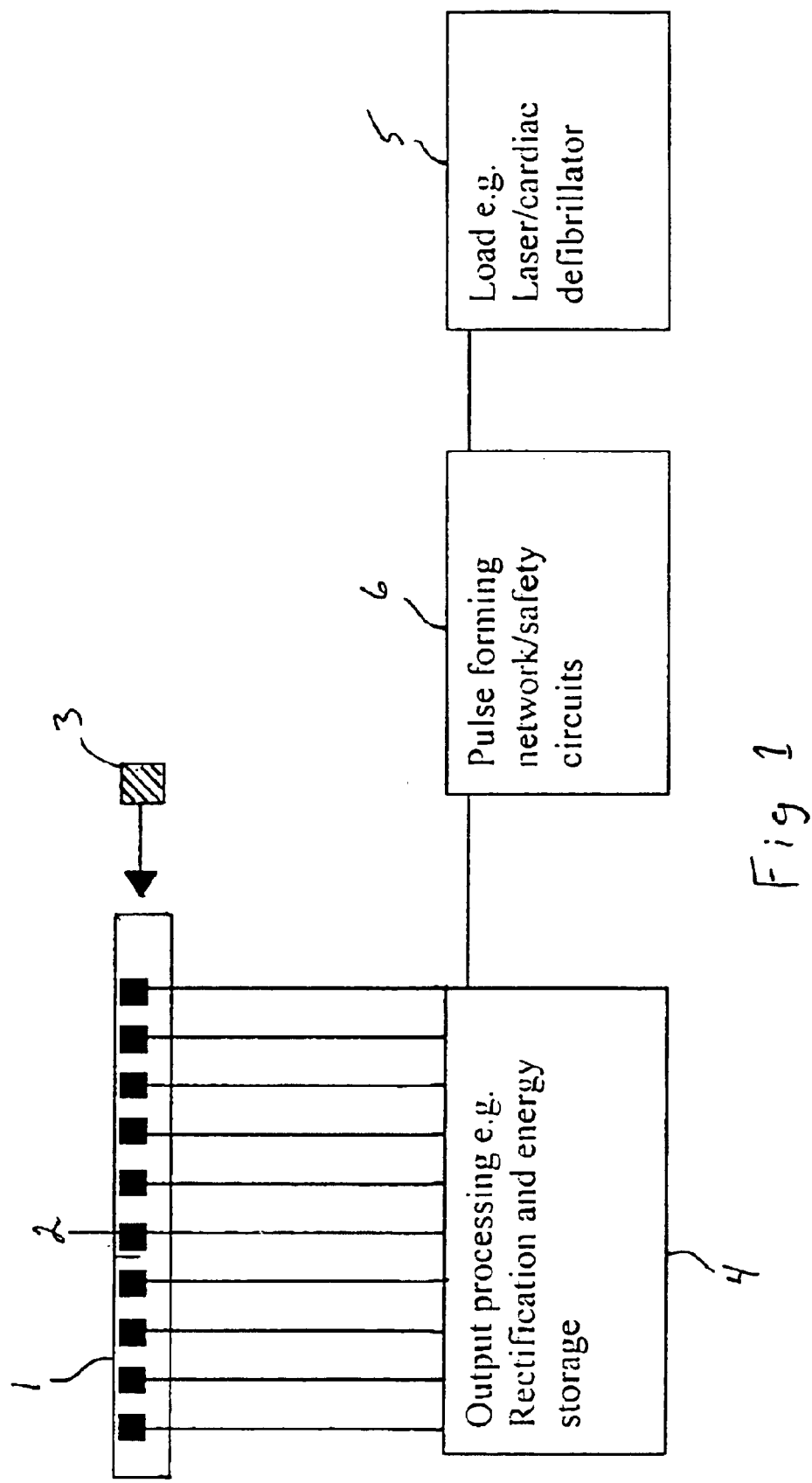
FIG. 1 is a schematic diagram of the generator of the present invention.

The apparatus comprises four basic elements and is schematically illustrated in FIG. 1; a) a barrel 1 or tube provided with at least one field coil 2, b) a magnetic armature 3 which is driven through the barrel 1 and coils 2 by propellant gases thereby producing an electrical output, c) an output processing means 4 which is preferably a capacitor or bank of capacitors charged by the output from the generator, and d) a load or output device 5 which is powered by the charge from the capacitors. In addition, the apparatus may comprise an electrical or electronic regulator 6 to connect the generator, capacitors and output device and to regulate the electrical flow and operation of those elements.

Figure 2:
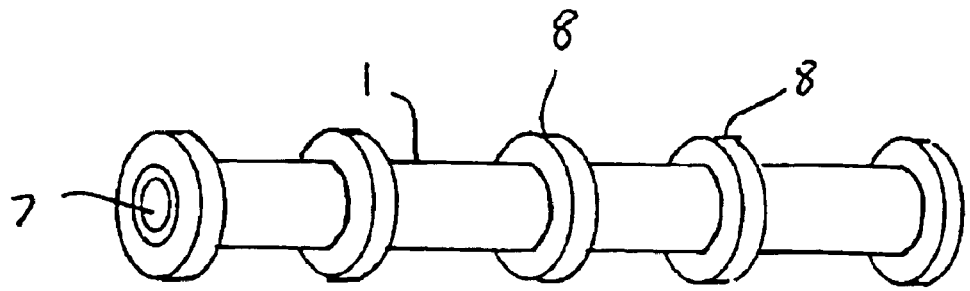
FIG. 2. is a view showing a straight barrel of a first embodiment of the present invention.
Figure 3:
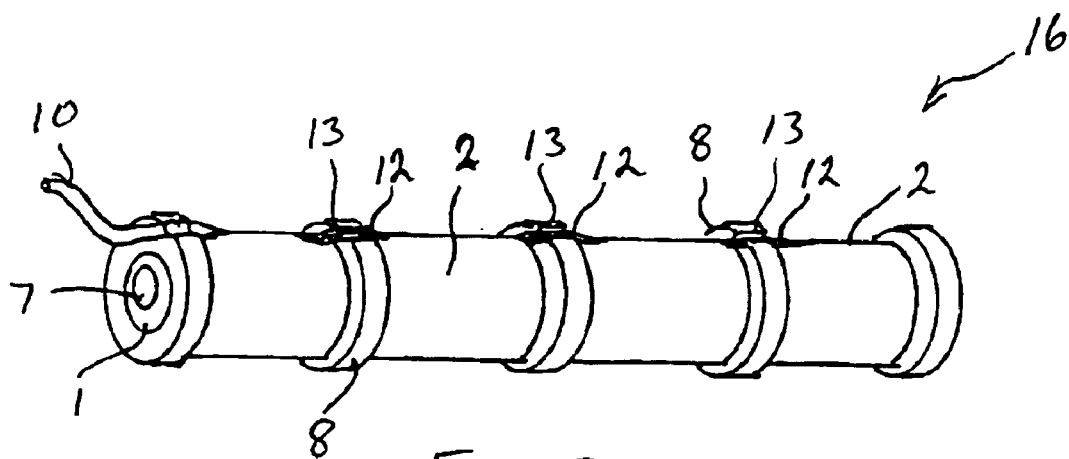
FIG. 3. is a view of the barrel of FIG. 2 with field coils in place.
Figure 4:
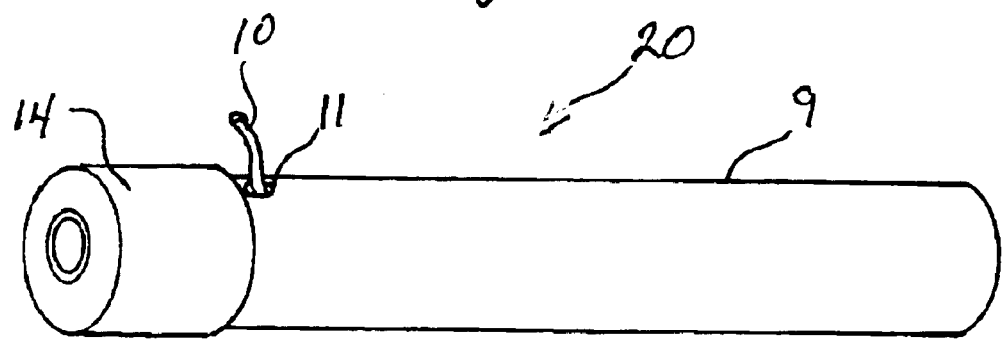
FIG. 4 is a view of the barrel and coils of FIG. 2 encased in a shielded housing.

FIGS. 2–4 illustrate a simple linear generator 20 which is representative of the present invention. The barrel 1 is formed from a non-magnetic and non-conductive material and forms a core around which the coils 2 are wound. As suitable materials for the barrel 1, high temperature and high strength polymers, such as but not limited to polycarbonates, are preferred. Fiber reinforced polymers may also be used. The materials used must be capable of withstanding the force of propellant explosion and the heat of friction from the passage of the magnetic armature 3. A bore 7 is provided through the barrel 1 and is sized to accommodate the magnetic armature 3. The bore 7 may be rifled in the normal manner to improve the flight of the armature 3. However, since the armature 3 does not have to have accuracy of flight upon leaving the barrel 1, rifling is not necessary and the bore 7 may be left smooth.

Disposed along the barrel 1 are a plurality of rings 8. Preferably made from the same material as the barrel 1, the rings 8 strengthen the barrel 1 and provide dividers between adjacent coils 2. In addition, they act as a standoff or support for an outer shield or cover 9 over the barrel/coil assembly 16. Cover 9 provides outer protection for the coils 2.

Coils 2 are made from electrically conductive wire wound around the barrel 1 between rings 8. Preferably, copper wire is used, however, any electrically conductive wire may be used. In particular, it is envisioned that room temperature super conductors would be desirable for use in the coils 2 for improved electrical flow and overall efficiency of energy generation. In addition, coils 2 are preferably wrapped or encased in a suitable material to provide protection from dirt and moisture.

In order to provide a uniform conductor for the electricity generated in the coils to reach a load or storage means, the conductors 12 of each coil 2 pass along the barrel 1 and are gathered to form a single cable 10 which passes through the outer cover 9 at a single location 11. To accommodate the conductors 12 along the barrel 1 thereby permitting the cover 9 to fit over the assembly 16, rings 8 are provided with notches 13 in their perimeter to receive the conductors 12.

Figure 5:
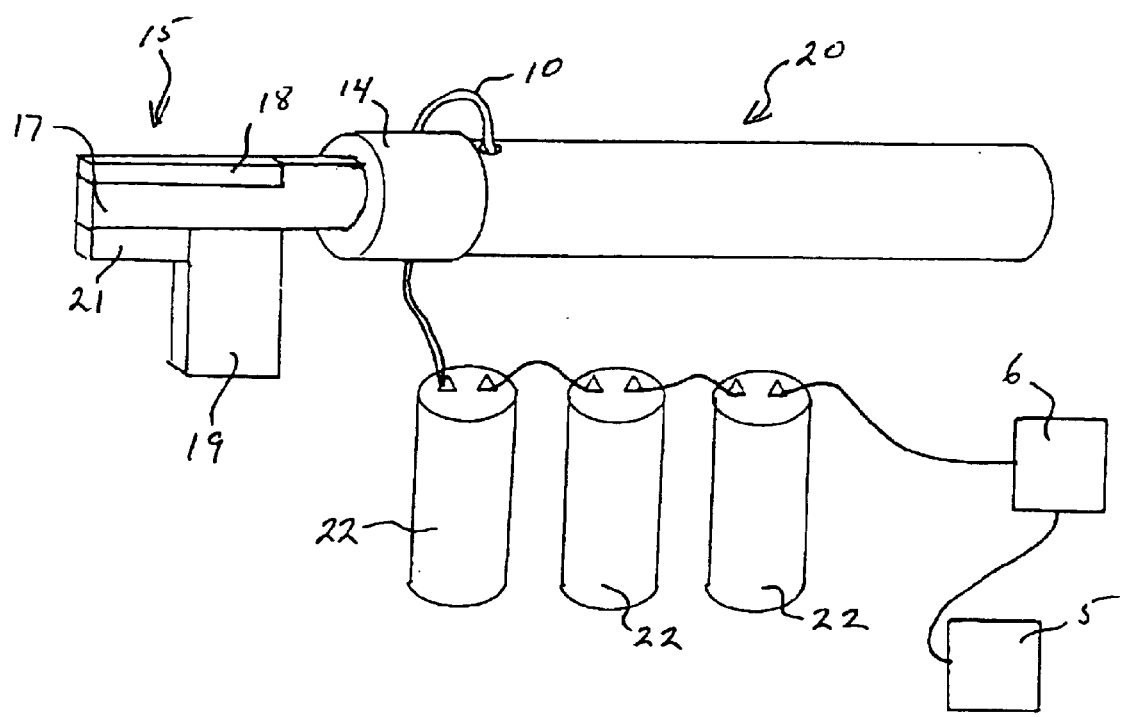
FIG. 5 is an embodiment of the first embodiment of the present invention with a projectile firing means attached and showing electrical storage, control and load means.

An attachment collar 14 is provided at one end of the generator 20 to facilitate connection of the generator to a firing mechanism 15. Such an arrangement is shown in FIG. 5. In this embodiment, the firing mechanism 15 corresponds to that used in firearms including a receiver 17, slide 18, magazine 19 and trigger mechanism 21, and operates in the normal manner to fire cartridges comprising an explosive propellant and the magnetic armature 2. Although the present embodiment uses a standard firearm mechanism and a cartridge based on standard firearm cartridges, this is only a representative example and it is within the scope of the invention to employ other firing mechanisms as well as propellants other than gunpowder. The type of firing mechanism will depend on the type of propellant used and the type of propellant used may depend on factors such as the size and generating capacity of the device.

Cable 10 may be connected directly to the load device to be powered by the generator 20. However, preferably, an output processor means 4 is provided which may comprise a storage means such as one or a plurality of capacitors 22 coupled to the load 5 by a regulator 6 to control the timing and level of electrical discharge to the load 5.

The magnetic armature 2 may theoretically be any magnetic material, including ceramic magnets. However, preferred materials are the rare earth elements having atomic numbers from 57 to 71 plus 21 and 39. They include lanthanum, cerium, praseodymium, neodymium, samarium, europium, gadolinium, terbium, dysprosium, holmium, erbium, thulium, ytterbium, lutetium, scandium, and yttrium. A particularly favorable magnet for the present use is neodymium-iron-boron, which has a very high degree of coercivity, i.e., it is very difficult to demagnetize. This is a particularly important requirement as the generator produces a strong de-magnetizing field.

The operation of the generator 20 is relatively straight forward. A round comprising a casing holding a quantity of explosive propellant and the magnetic armature 3 is loaded from the magazine 19 into the receiver 17. The trigger mechanism 21 is operated to ignite the propellant thereby causing the armature 3 to be propelled along the bore 7 of the barrel 1. As the armature 3 traverses the bore 7, the magnetic field crosses the wires of the field coils 2 at a high rate thereby inducing an electrical current in the turnings of the coils 2. The current flows through the conductors 12 and cable 10 to the output processor means 4 and from there to the load 5 under control from the regulator 6. In a typical application, each coil of the generator produces a voltage of single sinusoidal form which is rectified to produce a charge on the capacitors. This charge is boosted by successive coils to reach the energy level appropriate for the application. As each stage extracts energy, the projectile is slowed in its motion along the barrel and successive coils are designed to compensate for the reduced velocity so as to maintain the desired level of electrical output. Following passage along the bore 7, the magnetic armature 3 exits the barrel 1 at the end opposite the firing mechanism 15 in a manner common to firearm projectiles. However, due to magnetic resistance, the speed of the armature 3 is significantly less than that of a firearm projectile such that armature 3 is of negligible use as a free flying projectile. Indeed, under certain circumstances the speed of the armature 3 may be reduced sufficiently to permit capture and reuse of the armature 3.

The voltage produced by the generator is conducted to at least one capacitor 22 to produce a charge thereon. Preferably, a plurality of capacitors 22 capable of accepting a charge from the generator are provided. The individual capacitors 22 are preferably linked to form a bank and have electronic control means to regulate discharge as either a single bank or in successive discharges from the individual capacitors 22 of the bank.

Figure 6:
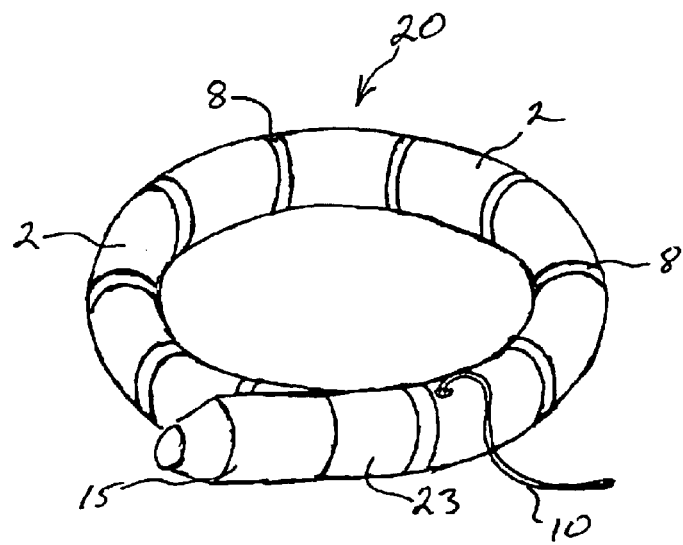
FIG. 6 is a view showing an alternative embodiment of the present invention.

Along this line, an alternative embodiment, illustrated in FIG. 6, provides the generator 20 in a circular form. The barrel 1 and its accompanying bore 7 form a circular raceway for the armature 3. Means may be provided to permit entry and exit of the armature 3. Alternatively, the armature 3 may be confined within the bore 7 which forms a continuous raceway of effective infinite length enabling the extraction of the maximum amount or energy from the passage of the armature 3. In this instance a firing mechanism 15 is connected to the barrel 1 by a metering means 23 and is capable of receiving a propellant charge. Gases generated by combustion of the propellant are passed into the barrel 1 through the metering means 23 to drive the armature 3 around the generator 20 as many times as possible until the motive force of the propellant is exhausted.

The firing mechanism includes a means to hold and fire the propellant charge thereby generating a gas pressure which is applied to drive the generator. The propellant charge itself may be any form of highly combustible solid, liquid or gaseous propellant such as a common blank firearm cartridge, caseless propellant, pressure injected liquid or gaseous propellants or the like, with the specific structure of the propellant chamber being dictated by the type and structure of the propellant charge to be used. For example, where the propellant charge is in the form of a common blank firearm cartridge, the propellant chamber may comprise a receiver section, a sear, a firing pin and trigger mechanism and a spent cartridge extractor. Where this apparatus is to provide for the generation of successive electrical pulses, the propellant chamber may also comprise a means to receive a magazine to feed successive cartridges to the receiver section as well as means to eject the spent cartridge and to cycle the mechanism to feed a fresh cartridge. When caseless ammunition is used, the extraction and ejection means become unnecessary.

When pressure injected liquid or gaseous propellants are used, the propellant chamber will comprise means to receive and ignite a propellant charge. Preferably, the propellant is provided in a precharged container which is connected to the chamber through a metering means to precisely meter a charge of propellant into the chamber for firing. In this embodiment, the associated firing mechanism will include means to operate the metering means and to ignite the propellant charge within the chamber.

In a further alternative embodiment, the armature 3 may be slowed and captured to be transferred to another adjacent generator 20 for reuse. In this manner, and with appropriate transfer means, a parallel pair of generators 20 may reuse the same armature on an alternating basis.

Figure 7:
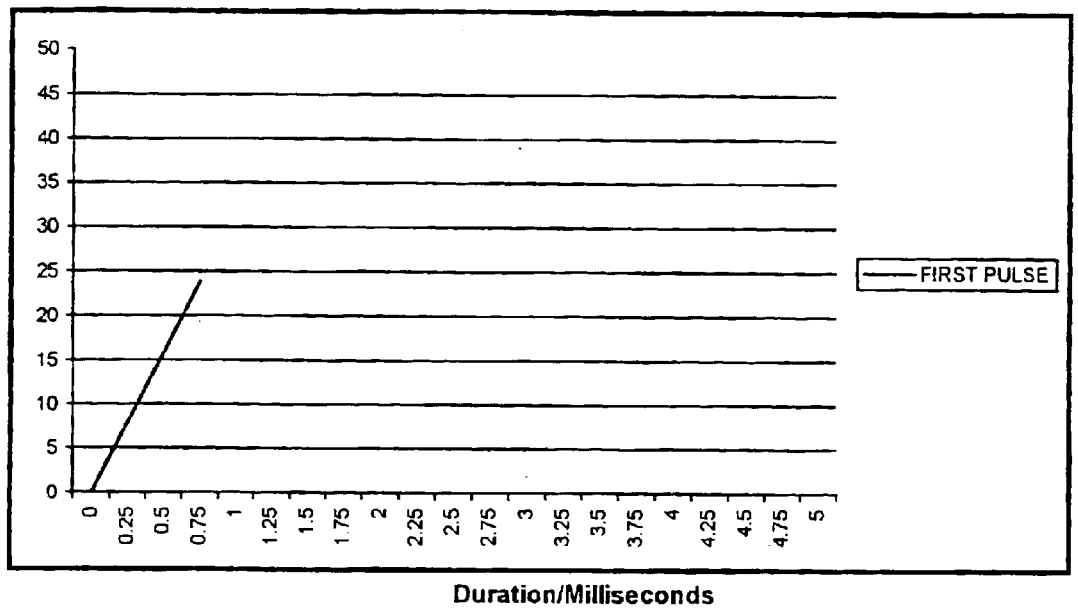
FIG. 7 is a graph showing the generation of a single energy pulse by the present invention.

Prototype bench tests were conducted using a 0.45" caliber barrel 1 with ten copper wire coils 2 wound thereabout. A 45ACP cartridge fired a rare earth magnet cylinder of 0.45" diameter and 1" long through the assembly. Based on a magnet velocity of 500 fps., the prototype liberated 2.3 joules of energy in a time of 1/750 second. Calculated as a percentage of the chemical energy of the cartridge, this amounts to an energy conversion rate of 3%. However, when calculated in terms of watts generated, the unit provided 20+kW per firing. FIG. 7 provides a graph showing the pulse rate generated by the prototype.

Figure 8:
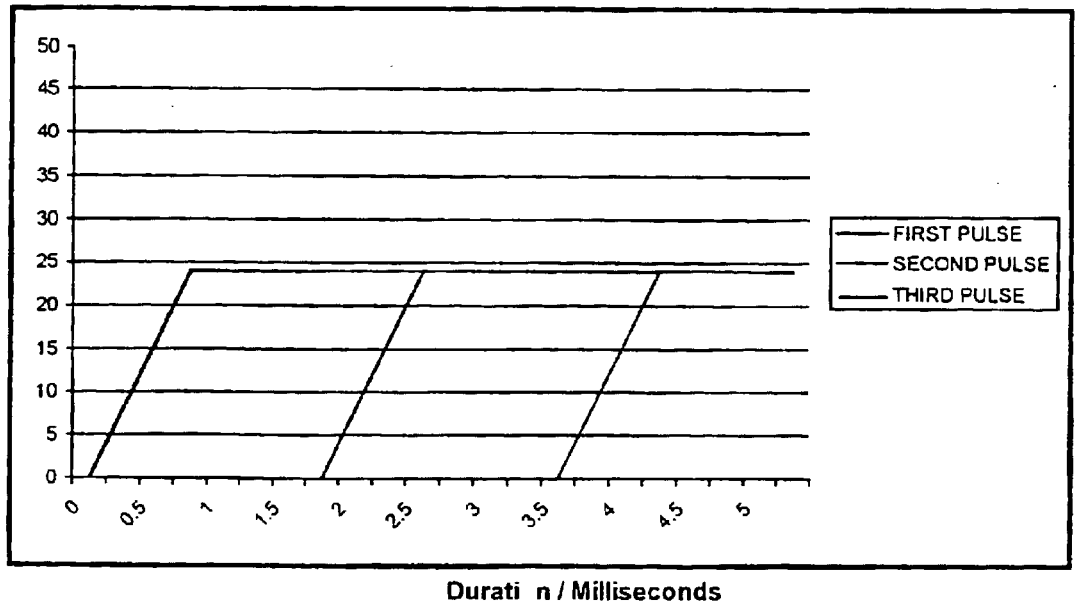
FIG. 8 is a graph showing the generation of multiple energy pulses by the present invention.

Preferably, the output of the generator is stored in one or more capacitors, the discharge of which is coordinated and timed with successive firings of the generator to provide a constant power level as shown by the graph of FIG. 8.

Although the prototype tests only provided an energy conversion rate of 3%, various steps can be taken to improve efficiency to provide higher conversion rates on the order of 50% or better. These would include optimization of the windings in terms of type, number and configuration, the use of improved conductors such as superconductors, and the like. In addition, miniaturization and single coil generators linked with a controlled firing sequence provide an apparatus that is readily adaptable to a wide range of outputs and usage as well as improving dissipation of heat generated by the propellant and friction.

The foregoing illustrates the preferred embodiments of the present invention and it is understood that many variations and modifications of those embodiments will be evident to those skilled in the art and may be carried out without departing from the spirit and scope of the present invention.

What is claimed is:

1. An apparatus for generating electrical energy comprising:
   an elongated conduit having a central bore adapted to receive a magnetic element for passage therethrough;
   a plurality of wire coils wound about said conduit and spaced along the length thereof;
   a magnetic element sized to pass through said bore; and
   means to propel maid magnetic element through said bore;
   wherein said conduit is curved so as to describe a circle having sufficient diameter to permit said magnetic element to freely traverse said bore, said conduit having a gas inlet and a gas outlet and said magnetic element being confined therein;
   whereby passage of said magnetic element through said bore induces an electrical current in said coils.

2. The apparatus of claim 1 further comprising an electrical storage means electrically connected to said coils and capable of receiving and storing current induced in said coils.

3. The apparatus of claim 2 wherein said conduit comprises a tube of non-magnetic and non-conductive material.

4. The apparatus of claim 3 wherein said magnetic element comprises a rare earth magnet.

5. The apparatus of claim 4 wherein said means to propel said magnetic element comprises an explosive propellant discharged into said bore.

6. The apparatus of claim 1, further comprising means to inject a propellant gas into said conduit through said gas inlet, said propellant gas being pressurized whereby said magnetic element is propelled within said conduit.

7. The apparatus of claim 1, further comprising:
   a combustion chamber connected to said conduit through said gas inlet;
   a supply of combustible propellant;
   means to charge a quantity of said propellant into said combustion chamber; and
   means to ignite said propellant;
   whereby combustion gas is directed through said gas inlet into said conduit whereby said magnetic element is propelled within said conduit.

8. A method of generating electricity from high pressure combustion gases comprising:
   providing a plurality of field coils in substantially circular arrangement on a barrel having a central bore therethrough;
   providing a magnetic armature sized to pass through said bore;
   providing a means to propel said armature through said bore comprising a ballistic propellant capable of generating high pressure combustion gases directed against said armature in a direction corresponding to said circular arrangement of said field coils; and
   propelling said magnetic armature through said bore whereby the magnetic field of said armature passing across said field coils induces electrical current in said coils.

9. A method in accordance with claim 8, wherein propelling a magnetic armature comprises propelling a magnetic pellet.

10. The method of claim 8, wherein said combustion gases are obtained from a charge of explosive propellant.

11. The method of claim 10, wherein said propellant comprises an ignitable powder, liquid, or gas.

* * * * *